United States Patent
Bateson et al.

(10) Patent No.: US 11,805,772 B2
(45) Date of Patent: Nov. 7, 2023

(54) BARRIER SYSTEM AND COMPONENT THEREOF

(71) Applicants: Hammer Technologies Ltd, Truro (GB); Dufort Associates Limited, Wadebridge (GB)

(72) Inventors: Tobias Murray Bateson, Truro (GB); John Francis Dufort, Wadebridge (GB)

(73) Assignees: Hammer Technologies Ltd, Truro (GB); Dufort Associates Ltd, Wadebridge (GB)

( * ) Notice: Subject to any disclaimer, the term of this patent is extended or adjusted under 35 U.S.C. 154(b) by 100 days.

(21) Appl. No.: 17/256,110

(22) PCT Filed: Jul. 3, 2019

(86) PCT No.: PCT/GB2019/051879
§ 371 (c)(1),
(2) Date: Dec. 24, 2020

(87) PCT Pub. No.: WO2020/008188
PCT Pub. Date: Jan. 9, 2020

(65) Prior Publication Data
US 2021/0169066 A1 Jun. 10, 2021

(30) Foreign Application Priority Data
Jul. 3, 2018 (GB) .................................... 1810928

(51) Int. Cl.
*A01M 29/24* (2011.01)
*H05C 1/00* (2006.01)
*H05F 3/02* (2006.01)

(52) U.S. Cl.
CPC ............... *A01M 29/24* (2013.01); *H05C 1/00* (2013.01); *H05F 3/025* (2013.01)

(58) Field of Classification Search
CPC ......... A01M 29/24; A01M 23/38; H05C 1/00; H05F 3/025
(Continued)

(56) References Cited

U.S. PATENT DOCUMENTS 3,243,120 A    3/1966  Lingard et al.
3,288,368 A *  11/1966 Athearn ................ A63H 18/02
                                                238/10 F
(Continued)

FOREIGN PATENT DOCUMENTS

AU    2009217471 A1    4/2010
EP       1237163 A2    9/2002
(Continued)

OTHER PUBLICATIONS

International Search Report, dated Sep. 25, 2019, PCT/GB2019/051879, 4 pages.
(Continued)

*Primary Examiner* — Thienvu V Tran
*Assistant Examiner* — Sreeya Sreevatsa

(57) ABSTRACT

A barrier system is provided, the barrier system comprising a first barrier component comprising: a support member formed from an electrically insulating material and having a first major surface, a second major surface and one or more edges extending between the first and second major surfaces; a first electrical conductor assembly comprising a first conductor member disposed on the first major surface of the support member; a second electrical conductor assembly comprising a second conductor member disposed on the first major surface of the support member, the second conductor member spaced apart and electrically insulated from the first conductor member; each of the first and second electrical conductor assemblies comprising an electrical contact member disposed an edge of the support member; wherein each
(Continued)

electrical contact member and the respective edge of the support member are configured to connect with a corresponding electrical contact member and the respective edge of a corresponding second barrier component, with the connection being formed by the movement of the second barrier component relative to the first barrier component in a direction substantially perpendicular to the plane of the first major surface. The barrier system finds particular use in the deterring of animals and the dissipation of accumulations of static electricity.

19 Claims, 9 Drawing Sheets

(58) Field of Classification Search
USPC .......................................................... 361/220
See application file for complete search history.

(56) References Cited

U.S. PATENT DOCUMENTS

| | | | |
|---|---|---|---|
| 3,729,133 A | 4/1973 | Covert | |
| 6,817,138 B1 | 11/2004 | McGill et al. | |
| 8,293,044 B1 * | 10/2012 | Riddell | A01M 29/26 256/10 |
| 9,585,377 B1 * | 3/2017 | Alshaheen | H05C 1/04 |
| 2005/0132636 A1 | 6/2005 | McGill et al. | |
| 2009/0309738 A1 * | 12/2009 | Hinkle | A01M 29/24 340/573.3 |
| 2011/0214339 A1 * | 9/2011 | Donoho | H05C 3/00 43/112 |
| 2014/0053788 A1 | 2/2014 | Riddell | |

FOREIGN PATENT DOCUMENTS

| | | |
|---|---|---|
| GB | 2518368 A | 3/2015 |
| JP | 2003299433 A | 10/2003 |
| WO | 2017034648 A1 | 3/2017 |
| WO | 2017218047 A1 | 12/2017 |

OTHER PUBLICATIONS

Written Opinion of the International Searching Authority, dated Sep. 25, 2019, PCT/GB2019/051879, 8 pages.

Patents Act 1977: Search report under Section 17, Application No. GB1810928.0. dated Dec. 17, 2018, 2 pages.

* cited by examiner

BARRIER SYSTEM AND COMPONENT THEREOF

The present invention relates to a barrier system. The barrier system finds use in deterring animals, for example in the protection of vehicles and installations or items vulnerable to being damaged by animals, for example rodents. The present invention also relates to components of the barrier system. In one embodiment, the barrier system is in the form of a mat. The system also finds use in an installation for reducing or preventing the build-up of static electricity, for example in protecting electrical instruments and other equipment vulnerable to static.

Animals, such as rodents, are responsible for considerable damage to a wide range of installations and items, such as wiring and pipework in houses, factories and other buildings, foodstuffs for both animals and humans. Animals are also responsible for causing damage to a wide range of vehicles, in particular motor vehicles, such as cars and motorcycles, as well as damaging parts or components of ships and airplanes.

Barriers for use in protecting items and installations from damage by animals, such as rodents are known in the art.

AU 2009217471 discloses a fabric for use in the control of animals, in particular for use as a barrier. The fabric comprises a plurality of woven threads in the form of a net or netting. The fabric is provided with first and second electrically conducting threads, with each first conducting thread being insulated from the adjacent second conducting threads. In use, an electric circuit is closed when an animal simultaneously contacts one or more of the first conducting threads and one or more of the second conducting threads, allowing an electric current to flow therebetween.

EP 1 237 163 discloses a covering for any kind of cable, to protect against damage from animals. The covering comprises a mesh of conductive material connected to a supply of electrical power.

An animal deterrent mat is disclosed in US 2009/0309738. The mat comprises first and second conductors. A complex control system produces a low-voltage detection pulse that is attenuated when an object comes into contact with the mat. The detection pulse is monitored and a deterrent stimulus is generated when the conditions indicate an animal is present on the mat.

A flexible cover providing an electrical shock upon contact is provided in U.S. Pat. No. 6,817,138. The cover comprises a plurality of layers, including a bottom insulating layer, a base layer that is electrically conductive, a medial insulating layer, a medial electrically conductive layer and a top insulation layer. A first set of stitches of electrically conductive material extend from the medial conductive layer to the top surface. A second set of stitches of electrically conductive material extend from the base conductive layer to the top surface, without contacting the medial conducting layer. An electrical circuit is completed when the first and second stitches are connected, for example by an animal contacting the cover. A similar protective cover is described and shown in US 2005/0132636.

A weedproofing sheet providing protection against animals is disclosed in JP 2003299433.

A track arrangement is disclosed in U.S. Pat. No. 3,729,133.

US 2011/0214339 discloses an electric pest deterrent track and system.

US 2014/0053788 discloses a pest deterrent device.

WO 2017/0344648 discloses an apparatus and a method for electrically grounding at least one mat in a load supporting surface.

WO 2017/218047 discloses a fencing apparatus and system.

More recently, GB 2518368 describes a range of embodiments of a pest deterrent barrier. In one embodiment, the barrier comprises elongate electrical conductive elements in a supporting matrix or substrate that is a woven textile fabric of electrically insulating material. One particular application for the barrier described is as a parking mat for protecting motor vehicles. In another application, the barrier is arranged as a sleeve to protect items, such as wiring or tubing of a vehicle or other apparatus.

While a number of attempts have been made to provide an effective barrier to provide protection against animals, such as rodents, there remains a need for an improved barrier. It would be advantageous if the barrier could be easy to manufacture, transport and store. It would also be advantageous if the barrier could be provided in a form that can be readily adapted to provide protection in a wide range of different situations and for a wide range of different items, objects and installations. It would also be advantageous if the barrier was easy to install and operate.

Many items of equipment or installations are vulnerable to discharges of static electricity, which can accumulate in items such as floor coverings. Discharges of static electricity, for example from a person, can damage sensitive electrical equipment. There is a need for an improved barrier to safely dissipate static electrical charges from people and other items and to prevent an accumulated static charge being discharged to sensitive equipment or other items that may be damaged.

According to a first aspect of the present invention, there is provided a barrier system, the barrier system comprising a first barrier component comprising:
  a support member formed from an electrically insulating material and having a first major surface, a second major surface and one or more edges extending between the first and second major surfaces;
  a first electrical conductor assembly comprising a first conductor member disposed on the first major surface of the support member;
  a second electrical conductor assembly comprising a second conductor member disposed on the first major surface of the support member, the second conductor member spaced apart and electrically insulated from the first conductor member;
  each of the first and second electrical conductor assemblies comprising an electrical contact member disposed an edge of the support member;
  wherein each electrical contact member and the respective edge of the support member are configured to connect with a corresponding electrical contact member and the respective edge of a corresponding second barrier component, with the connection being formed by the movement of the second barrier component relative to the first barrier component in a direction substantially perpendicular to the plane of the first major surface.

In use as a deterrent for animals, the barrier component is placed with the first major surface in the path of a target animal around or in the region of an item, vehicle or installation to be protected. An electrical supply is connected to the first and second electrical conductor assemblies, such that the first and second conductor assemblies have opposite polarities, whereby when the first and second conductor members are bridged by an animal stepping on or contacting the first major surface an electrical circuit is completed and an electrical current flows, providing an electrical shock to the animal.

In use as a protection against a discharge of an accumulated of static electrical charge, the barrier component is placed with its first major surface exposed, in particular in the path of a person. The conductor assemblies are connected to a suitable earth, for example the earth wire of an electrical power supply circuit. The person contacts the first and second conductor assemblies on the first major surface, which dissipates any static electrical charge accumulated in the person to earth.

The barrier system of the present invention comprises a first barrier component. The first barrier component comprises a support member having a first major surface having disposed thereon first and second conductor assemblies as described in more detail below. In use, the barrier component is disposed in the expected path of an animal to be deterred, such as a rodent, with the first major surface of the support member disposed to lie in the path expected to be traversed by the target animal or animals. In many uses, the barrier component is disposed on a floor, with the first major surface uppermost. However, other orientations of the barrier component are possible.

The first barrier component is intended in use to be connected with a second barrier component to provide a barrier to the target animals comprising a plurality of barrier components. In this way, the barrier components may be arranged in any suitable pattern required to protect the vehicle, installation or other items. It is a particularly advantageous aspect of the barrier system that the first, second and further barrier components may be of the same shape, configuration and design, allowing a single barrier component to be manufactured and the system employed in a wide variety of situations and locations.

The barrier component comprises a support member. The support member is a generally planar member having first and second major surfaces with one or more edges extending between the first and second major surfaces.

The support member may be any suitable shape. The support member has one or more edges. It is most preferred that the support member is shaped to be able to engage with other barrier components having support members of the same or similar shape, most preferably with the plurality of support members being engaged together to allow their first major surfaces to form a substantially continuous surface presenting a barrier to the target animal or animals, without substantial spaces between adjacent support members. In one preferred embodiment, the support member is polygonal in shape, that is the first and second major surfaces have this shape, for example triangular. A particularly preferred shape for the support member is rectangular, with a square being preferred for many embodiments.

The support member may be of any suitable thickness. In this respect, the thickness of the support member is the distance between the first and second major surfaces of the support member. The thickness will be determined by such factors as the material from which the support member is formed and the duty to be performed. For example, in embodiments in which the barrier system is intended for use in the protection of a vehicle, in one use the vehicle is parked on the barrier components. In this case, the support member is required to be sufficiently strong to support the vehicle without being crushed or deformed.

For many embodiments, the support member has a thickness of from 0.5 to 5 cm, preferably from 1 to 4 cm, more preferably from 2 to 3 cm.

The support member may be formed from any suitable material. The selection of the material will depend upon such factors as the duty to be performed, for example to provide sufficient resistance to being crushed. The support member is preferably formed from a material that is water resistant. The material of the support member is selected to be electrically insulating. It is particularly preferred that the material of the support member allows the support member to be formed by moulding. Preferably, the support member is formed from a polymer. Suitable polymers include polyolefins, such as polyethylene, polypropylene and copolymers thereof. One preferred material for the support member is polyvinylchloride (PVC). Suitable materials for the support member are available commercially.

As noted above, the barrier component comprises first and second conductor assemblies disposed on the first major surface of the component. Each conductor assembly comprises at least one conductor member. In use for deterring animals, the conductor members are exposed in the path of the target animal, such that when the animal places its feet on conductor members of both the first and second conductor assemblies an electrical circuit is completed and an electrical shock is applied to the animal. In use for dissipate static electrical charges, the conductor members are exposed in the path of a person or other object in which a charge of static electricity can accumulate.

To accommodate the conductor members of the first and second conductor assemblies, the first major surface may be substantially continuous, preferably flat, with the conductor members mounted to the surface in a spaced apart arrangement, to prevent electrical short circuits between the first and second conductor assemblies. In a preferred embodiment, the first major surface of the support member comprises a plurality of spaced apart lands, with adjacent lands separated by a cavity, the conductor members being mounted on the lands of the support member. Preferably, each land accommodates a single conductor member. The land may be provided at the first major surface with a channel to accommodate the respective conductor member.

In one preferred arrangement, the support member comprises holes extending from the first major surface to the second major surface. The holes allow water to drain through the support member and not collect on the first major surface when in use. In embodiments in which the first major surface of the support member is provided with a plurality of lands, the holes preferably extend through the first support member between the lands.

As described above, the conductor members are disposed on the first major surface, with the first and second conductor members being spaced apart. In this way air and/or the material of the support member act to electrically insulate the first and second conductor members from each other. The distance between the first and second conductor members is selected according to a number of factors, depending upon the intended use.

For example, when acting as a deterrent for animals, the distance may be selected according to the size and step pattern of the target animal. In one embodiment, the distance between the first and second conductor members is selected to be less than the width and/or length of the foot of the target animal, such that a single foot of the animal can make an electrical connection between the first and second conductor members. In an alternative embodiment, the distance between the first and second conductor members are spaced further apart, requiring the animal to make an electrical connection between the first and second conductor members by two or more feet and/or its tail, for example. In general, the distance between the first and second conductor members should be sufficiently large to prevent arcing, but close enough together to prevent the target animal from easily traversing the surface of the first support member without touching the conductor members and completing the electrical circuit to deliver an electrical shock.

When in use to dissipate accumulations of static electrical charge, both the first and second conductor members are connected to a suitable earth. As a result, the distance between the conductors is less critical and is required to be sufficient to allow at least one of the conductors to be contacted by a person or other item in which static electrical energy can accumulate. For example, the conductors are spaced apart such that a person standing or walking on any part of the first major surface of the support member is in contact with at least one of the conductor members.

When in use to dissipate accumulation of static electrical charges, the first and second conductor members do not have opposite polarities and simply act as conductors to dissipate the static charge to earth. Therefore, in one embodiment, the first and second conductor members may be connected together to form a single conductor member.

The distance between the first and second conductor members may be up to 30 mm, preferably up to 25 mm, more preferably up to 20 mm, still more preferably up to 15 mm, more preferably still up to 10 mm. The distance may be from 3 mm, preferably from 5 mm, more preferably from 7 mm. In one preferred embodiment, the distance between the first and second conductor members is from 5 to 25 mm, preferably from 6 to 15 mm. For many applications, a distance of from 8 to 10 mm is particularly suitable.

The first and second conductor members may have any suitable form. For example, the conductor members may each comprise one or more wires. A particularly preferred form is for the first and conductor members to be formed from strips of an electrically conductive material. The strips may have any suitable width, for example according to the size and step pattern of the target animal or a person standing or walking on the barrier component. The width of the first and second conductor members may be up to 30 mm, preferably up to 25 mm, more preferably up to 20 mm, still more preferably up to 15 mm, more preferably still up to 10 mm. The width may be from 3 mm, preferably from 5 mm, more preferably from 7 mm. In one preferred embodiment, the width of the first and second conductor members is from 5 to 25 mm, preferably from 6 to 15 mm. For many applications, a width of from 8 to 10 mm is particularly suitable. It is preferred that the width of the first conductor member is substantially the same as the width of the second conductor member.

The conductor members may be formed from any suitable electrically conductive material. Metals are particularly preferred conductive materials with steel being a preferred metal. Other suitable metals include copper and silver. Other conductive materials may be employed, for example conductive polymers and carbon fibre.

The first and second conductor members may have any suitable thickness. The thickness of the conductor members will be determined by such factors as the material used to form the members and the duty to be performed, for example the load to be borne in use. The conductor members may have a thickness up to 3 mm, preferably up to 2 mm, more preferably up to 1.5 mm. The conductor members may have a thickness from 0.2 mm, preferably from 0.5 mm, more preferably from 0.5 mm. A thickness of from 0.5 to 1.5 mm is particularly suitable, preferably from 0.75 to 1.2 mm. A thickness of about 1.0 mm is suitable for many metal conductor members, in particular steel.

The first and second conductor members may extend in any suitable pattern or configuration on the first major surface. In one embodiment, each conductor element is substantially straight. Alternatively, each conductor element may extend in a non-linear pattern. This has the advantage of the first major surface being more difficult for an animal to traverse without contacting the first and second conductor members. For example, the first and second conductor members may extend in a curved or wave-like pattern. Other suitable patterns include a helical arrangement, for example a rounded or squared helix. In a particularly preferred embodiment, the first and second conductor members extending across the first major surface in a zig-zag pattern, that is extending in a pattern having alternating left and right turns. The zig-zig pattern may be irregular or regular. A regular pattern is preferred.

Each of the first and second conductor members preferably comprises a plurality of conductor portions, which may each extend in the patterns described above. In one particularly preferred embodiment, both the first and second conductor members comprise a plurality of conductor portions, with the conductor portions of the first conductor member being interdigitated with the conductor portions of the second conductor member, so as to provide an alternating pattern of first and second conductor portions.

The first conductor assembly and the second conductor assembly are spaced apart and electrically insulated from each other. Any suitable insulating material may be employed between the conductor assemblies. Most preferably, the insulator is air.

Each of the first and second conductor assemblies comprises an electrical contact member at an edge of the support member. In use as an animal deterrent, an electric potential is applied to the first and second conductor members through the respective contact member. The electrical supply is provided when the barrier component is connected along the edge containing the electrical contact members to an adjacent barrier component. In use to dissipate static electrical charge, the conductor assemblies are connected to a suitable earth. Again, a connection to earth is provided when the barrier component is connected along the edge containing the electrical contact members to an adjacent barrier component.

Each of the first and second conductor assemblies may have one or more electrical contact members at one edge of the support member, a plurality of edges, most preferably at all edges of the support member, allowing the barrier components to be connected to form a barrier having a large surface area. For example, in the preferred embodiment of the barrier component having a rectangular support member, each of the first and second conductor assemblies comprises at least one, preferably two or more contact members at each of the four edges of the support member.

As noted above, the electrical contact members of one barrier component are configured to connect with the corresponding contact members of a second barrier component when connected along the respective edge of the support member. In particular, the contact members are configured to interconnect when the second barrier component is moved in direction substantially perpendicular to the plane of the first major surface of the support member. For example, when the barrier component is installed horizontally, for example on a floor, the second barrier component is moved vertically downwards to connect with the contact members at the edge of the support member of the installed barrier component.

The contact members may have any suitable form that allows connection in the aforementioned manner. Preferably, the contact member has a contact surface that is biased laterally away from the edge of the support member. For example, the contact member may be resilient. In one preferred embodiment, the contact member has a contact surface extending substantially perpendicular to and away from the first major surface of the support member. In one particularly preferred embodiment, the contact member is provided by a portion of the respective conductor member extending beyond the edge of the support member.

As noted above, the contact members provide a means to electrically connect the first and second conductor assemblies to a second barrier component. To allow for a secure connection between adjacent barrier components, it is preferred that the edge portions of the support member are provided with one or more engaging elements for engaging with an adjacent barrier component, in particular to hold the respective contact members in electrical contact with one another. Any suitable form of engaging element may be employed. As described above, the contact members of the barrier component are formed to connect to a respective contact member of a second barrier component by movement of the second barrier component relative to the barrier component along a line perpendicular to the plane of the first major surface of the support member. Therefore, it is preferred that the one or more engaging elements are formed to allow the barrier component to engage with a second barrier component in the same manner as the contact members engage, that is by movement of the two barrier components relative to one another along a line substantially perpendicular to the plane of the first major surface.

In one preferred embodiment, the edge portions of the support member provide the one or more engaging elements. A particularly preferred embodiment has the edge portion of the support member provided with a male engaging element extending laterally from the support member for engaging with a female engaging element of a corresponding barrier component. More preferably, the edge portion of the support member is provided with a male engaging element and a female engaging element. An even more preferred arrangement is to provide the edge portion with a plurality of male engaging elements extending laterally from the support member, with adjacent male engaging elements being separated by a female engaging element. To allow the opposing edge portions of two barrier components to be connected in the preferred manner indicated above, that is by movement of one barrier component relative to the other barrier component in a direction perpendicular to the plane of the first major surface, the male engaging element is preferably a protrusion formed with a distal portion of the male engaging element having a width greater than the width of a proximal portion of the male engaging element. The corresponding female engaging element comprises a recess in the edge portion of the support member having a distal portion of the recess with a width less than the width of a proximal portion of the recess.

In a preferred embodiment, the male and female engaging elements of the engaging elements are formed integrally with the support member, for example by moulding.

As noted above, when used for deterring animals, the first and second conductor assemblies have opposite electrical polarities, such that an electrical current is caused to flow therebetween when an animal bridges the first and second conductor members. In light of this, it is particularly preferred to provide engaging elements on one edge portion of the support member in a different configuration to those of a second edge of the support member, such that first and second barrier components can only be connected together in a pattern that maintains a consistent polarity of the first and second conductor assemblies of both barrier members, that is the first conductor assembly of the first barrier component can only be connected to the first conductor assembly of the second barrier component and likewise for the second conductor assemblies.

Accordingly, in a further aspect, the present invention provides a barrier system comprising a first barrier component and a second barrier component, each of the first barrier component and second barrier component comprising:

a support member formed from an electrically insulating material and having a first major surface, a second major surface, a first edge portion having a first edge extending between the first and second major surfaces and a second edge portion having a second edge extending between the first and second major surfaces;

a first electrical conductor assembly comprising a first conductor member disposed on the first major surface of the support member and having an electrical contact member at each of the first and second edges;

a second electrical conductor assembly comprising a second conductor member disposed on the first major surface of the support member, the second electrical conductor member spaced apart and electrically insulated from the first electrical conductor member and having an electrical contact member at each of the first and second edges;

wherein the first edge portion is provided with one or more first engaging elements and the second edge portion is provided with one or more second engaging elements, the arrangement of the second engaging elements on the second edge portion being of a different configuration to the arrangement of the first engaging elements on the first edge portion;

whereby the first edge portion of the first barrier component is configured to engage with the first edge portion of the second barrier component, the second edge portion of the first barrier component is configured to engage with the second edge portion of the second barrier component, and the first edge portion of the first barrier component is not engageable with the second edge portion of the second barrier component.

In the barrier component of this aspect of the invention, the edge portions of the support member are formed to allow adjacent barrier components to be physically connected only in specific orientations, in order to ensure the correct polarity of the first and second conductor assemblies.

Suitable means to limit the orientations of the interconnection include having engaging elements that are compatible with some, but not all of the other engaging elements of the barrier component. As described above, in one preferred embodiment, the edge portions of the support member provide the one or more engaging elements. A particularly preferred embodiment has the edge portion of the support member provided with a male engaging element extending laterally from the support member for engaging with a female member of a corresponding barrier component. More preferably, the edge portion of the support member is provided with a male engaging element and a female engaging element. An even more preferred arrangement is to provide the edge portion with a plurality of male engaging elements extending laterally from the support member, with adjacent male engaging elements being separated by a female engaging element. To allow the opposing edge portions of two barrier components to be connected in the preferred manner indicated above, that is by movement of one barrier component relative to the other barrier component in a direction perpendicular to the plane of the first major surface, the male engaging element is preferably a protrusion formed with a distal portion having a width greater than the width of the proximal portion. The corresponding female engaging element comprises a recess in the edge portion of the support member having a distal portion with a width less than the width of the proximal portion. In these embodiments, the size and/or pattern of the male and female engaging elements at a first edge of the support member is different to that at a second edge. In this way, the barrier component may be engaged at the first edge only along the first edge of the second barrier component and engaged at the second edge only along the second edge of the second barrier component.

Other features of the barrier components are as described above.

As noted above, a particularly preferred pattern for the first and second conductor members is one comprising a plurality of interdigitated conductor portions. In a preferred embodiment, the first and second conductor assemblies both have at least one contact member at an edge of the support member. In order to achieve this, it is necessary to have the first conductor member cross the second conductor member. However, when the first and second conductor members are required to have an opposite electrical polarity, it is necessary to ensure that the first and second conductor members are electrically insulated from each other at this location. It has been found that this can be achieved in a manner that is simple and robust by having the first conductor member extend between the second conductor member and the support member and spaced from the second conductor member.

Accordingly, in a further aspect, the present invention provides a barrier system comprising a barrier component comprising:
 a support member formed from an electrically insulating material and having a first major surface, a second major surface and one or more edges extending between the first and second major surfaces;
 a first electrical conductor assembly comprising a first conductor member disposed on the first major surface of the support member;
 a second electrical conductor assembly having a second conductor member disposed on the first major surface of the support member, the second electrical conductor member spaced apart and electrically insulated from the first electrical conductor member;
 the first conductor assembly comprising a first electrical contact member at an edge of the support member and the second conductor assembly comprising a second electrical contact member at the edge of the support member;
 a portion of the first conductor member extending between the second conductor member and the support member to the edge of the support member, the first conductor member being spaced apart and electrically insulated from the second conductor member.

In the barrier component of this aspect of the invention, the first conductor member has a portion extending between the second conductor member and the support member. The first conductor member is spaced apart from the second conductor member at this location.

In a preferred embodiment, the support member is provided with an opening to accommodate the portion of the first conductor member. More preferably, the opening is a recess in the first major surface of the support member, allowing electrical insulation to be provided by air between the first and second conductor members.

Other features of the barrier components are as described above.

As described above, the barrier component comprises first and second conductor members disposed on the first major surface of the support member. In use, these conductor members are exposed to an animal, a person or other item contacting the first major surface. The first and second conductor members are secure to the support member. Any suitable means to secure the first and second conductor members may be employed. However, a particularly simple and robust way to connect each conductor member to the support member comprises an engaging member extending from the conductor member into a cavity formed in the first major surface of the support member and engaging with the inner surface of the cavity.

Therefore, in a further aspect, the present invention provides a barrier component comprising:
 a support member formed from an electrically insulating material and having a first major surface, a second major surface and one or more edges extending between the first and second major surfaces;
 a first electrical conductor assembly comprising a first electrical conductor member disposed on the first major surface of the support member; and
 a second electrical conductor assembly comprising a second electrical conductor member disposed on the first major surface of the support member, the second electrical conductor member spaced apart and electrically insulated from the first electrical conductor member;
 wherein each of the first and second electrical conductor members comprises at least one engaging member, each engaging member extending from the first major surface into a cavity formed in the support member, each engaging member engaging the inner surface of the respective cavity to retain the electrical conductor on the first major surface of the support member.

To retain the first and second conductor members on the first surface of the support member, each conductor member is provide with at least one engaging member. Each conductor member is most preferably provided with a plurality of spaced apart engaging members to ensure the conductor member is retained across the entire first major surface of the support member.

The engaging members may be have any suitable form. In one preferred embodiment, each engaging member comprises a tab extending from the respective conductor member. The edges of the tab engage with the inner surface of the respective cavity formed in the support member. To ensure a secure engagement, the edges of the tab are preferably provided with one or more teeth.

As described above, one particularly preferred embodiment comprises first and second conductor members in the form of strips of conducting material. In a preferred embodiment, the engaging member is formed as a tab cut from the strip, for example by stamping, with the tab connected to the strip along one edge. Advantageously, during assembly, the conductor member may be placed in position on the first major surface of the support member and the tab simply pushed down into the cavity, to engage with the support member.

The cavity in the support member is of a depth to accommodate the engaging member. In one preferred embodiment, the cavity is a bore extending through the support member from the first major surface to the second major surface.

Other features of the barrier components are as described above.

In a further aspect, the present invention provides a barrier system comprising a plurality of barrier components as hereinbefore described.

The barrier components of the present invention may be employed in a wide range of different ways. As indicated above, in one application, a plurality of the barrier components are connected together on a horizontal surface, such as a floor, to form a barrier in the form of a mat. In this respect, the mat may be considered to be an n×m array of the barrier components, where n and m are both integers, with n being 2 or higher and m being 1 or higher. The size and shape of the array can be designed according to the items being protected from animals or the area to be provided with protection against static discharges. For example, the array can be installed around a particular item or installation. Alternatively, the array can be a mat onto which items are placed, for example vehicles are driven or placed.

In another use, one or more barrier components may be oriented at other angles, for example vertically. In one embodiment, the barrier system of the present invention comprises first and second barrier components as described above, together with a connecting component for engaging with an edge portion of the first barrier component and an edge portion of the second barrier component.

In a further aspect, the present invention provides a barrier system comprising a first barrier component and a second barrier component, each of the first and second barrier components comprising:
  a support member formed from an electrically insulating material and having a first major surface, a second major surface and an edge portion having an edge extending between the first and second major surfaces, the edge portion comprising a plurality of engaging members;
  a first electrical conductor assembly comprising a first conductor member disposed on the first major surface of the support member;
  a second electrical conductor assembly comprising a second conductor member disposed on the first major surface of the support member, the second electrical conductor member spaced apart and electrically insulated from the first electrical conductor member;
  the barrier system further comprising a connecting component comprising a first edge portion having a plurality of engaging members for engaging with the edge portion of the first barrier component and a second edge portion having a plurality of engaging members for engaging with the edge portion of the second barrier component.

The connecting component may connect with and hold the first and second barrier components in any suitable orientation, for example with the first and second barrier components being perpendicular to one another. In this example, the barrier components can be connected to form a horizontal barrier which animals are deterred from crossing, as well as a vertical barrier that provides both a physical and an electrical deterrent to be crossed by the animal. The connecting component may also be used to connect first and second barrier components extending in a single plane, for example horizontally. The connecting component may hold the first and second barrier components at other angles to each other, for example at an included angle of from 50 to 150°, more preferably from 60 to 130°, still more preferably from 70 to 120°.

The connecting component may also be arranged to provide a pivoted or hinged connection between the first and second barrier components. In this way, the angle between the first and second barrier components may be altered, as required. In addition, the pivoted or hinged connection allows one of the first and second barrier components to be moved away from a supporting surface, such as a floor, for example to allow a vehicle or other item to be moved.

The connecting component may comprise first and second conductor assemblies having conductor members, as described above, to interconnect the first and second conductor assemblies of the first and second barrier components. Alternatively, separate cables may be used to interconnect the first and second conductor assemblies of the first and second barrier components. As a further alternative, electrical power may be supplied in parallel from a supply to both the first and second barrier components.

Other features of the barrier components are as described above.

In a further aspect, the present invention provides a barrier system comprising a plurality of barrier components as hereinbefore described and one or more connecting components.

The barrier system of the present invention may comprise a plurality of the barrier components, as noted above. The barrier components may be employed alone and connected to form an array, as also described above. More preferably, the system comprises, in addition to the barrier components, one or more edge components. Each edge component is provided with an edge portion having engaging elements and is able to connect to an edge of the barrier components. The edge component acts to protect the exposed edges of the barrier components in the array and is preferably provide with a rounded and/or chamfered surface, to provide a rounded or chamfered edge surface to the array.

As discussed above, the support member may be formed from a range of different materials, with polymers being especially preferred. The properties of the material of the support member are determined by the duty to be performed, as well as the manner of manufacture. In this respect, it is particularly preferred to form the support member from a thermoplastic polymer having a Shore A hardness of from 80 to 100. This hardness allows the support member to be moulded on a large scale, but also to provide sufficient robustness and durability in use.

Accordingly, in a further aspect, the present invention provides a barrier system comprising a barrier component, the barrier component comprising:
  a support member formed from an electrically insulating material and having a first major surface, a second major surface and one or more edges extending between the first and second major surfaces, wherein the support member is formed from a thermoplastic polymer having a Shore A Hardness of from 80 to 100;
  a first electrical conductor assembly comprising a first conductor member disposed on the first major surface of the support member; and
  a second electrical conductor assembly comprising a second conductor member disposed on the first major surface of the support member, the second electrical conductor member spaced apart and electrically insulated from the first electrical conductor member.

The thermoplastic polymer may be any suitable polymer having a Shore A Hardness in the range of from 80 to 100.

Examples include polyolefins, such as polyethylene and polypropylene and copolymers thereof. One preferred polymer is polyvinylchloride (PVC).

The Shore A Hardness of the polymer is preferably from 85 to 95, more preferably about 90.

With respect to polymers for use in forming the support member, it is preferred to include a filler in the polymer. The presence of the filler improves a range of properties of the polymer, for example impact strength and fire retardancy. Suitable fillers are known in the art and include metal oxides, such as zinc oxide.

The filler is preferably present in an amount of from 1 to 5% by weight, more preferably from 1.5 to 4% by weight, still more preferably from 2 to 3% by weight, in particular about 2.5% by weight.

In one preferred embodiment, the barrier component comprises all the features of the different aspects hereinbefore described.

The support member may be provided with holes therethrough, as discussed above, to allow for water to drain from the first major surface of the support member. In one preferred embodiment, the second major surface of the support member is provided with one or more grooves or channels therein, preferably extending to an edge of the support member. This provides further drainage and prevents water accumulating beneath or behind the support member when the barrier component is in use.

In use, the barrier components are placed in the required position to protect the items or installation of interest. When animals are to be deterred, an electrical supply is connected to the barrier components to provide an electrical potential across the first and second conductor members. As noted above, when an animal contacts both the first and second conductor elements an electrical current is caused to flow, providing the animal with a shock. The electrical shock may be of any required or suitable intensity. In one embodiment, the animal is provided with an electrical shock of a low intensity, sufficient to act as a deterrent and persuade the animal not to return to the barrier component. Alternatively, higher intensity electrical charges may be delivered to the animal, up to and including lethal shocks.

The barrier system preferably comprises a controller for supplying the electrical energy to the barrier components. The controller is preferably configured to supply electrical energy in pulses when contact is made between the first and second conductor members, in particular pulses at a frequency of up to 2 Hz, more especially up to 1 Hz. A typical electrical supply to the barrier components from the controller is a potential of from 7,000 to 8,000 V at a power of from 3 to 4 Watts, with a pulse duration of from 0.5 to 6 ms, preferably from 1 to 5 ms, still more preferably from 2 to 4 ms, for example about 3 ms.

In use to dissipate accumulations of static electrical energy, the barrier system is connected to a suitable earth, as noted above. For example, the system may be connected to the earth of a conventional electrical power supply or mains system. Alternatively, an independent earth may be provided in known manner, for example in situations where no mains power supply with a suitable earth is readily available.

In a further aspect, the present invention provides an animal deterrent barrier system comprising one or more barrier components as hereinbefore described.

In a further aspect, the present invention provides a static electricity dissipating barrier system comprising one or more barrier components as hereinbefore described.

The present invention further provides the use of one or more barrier components as hereinbefore described in the deterring of animals.

Finally, the present invention provides the use of one or more barrier components as hereinbefore described in the dissipation of an accumulation of static electrical charge.

Embodiments of the barrier components and barrier system of the present invention will now be described, for illustration purposes only, with reference to the accompanying drawings, in which.

Figure 1:
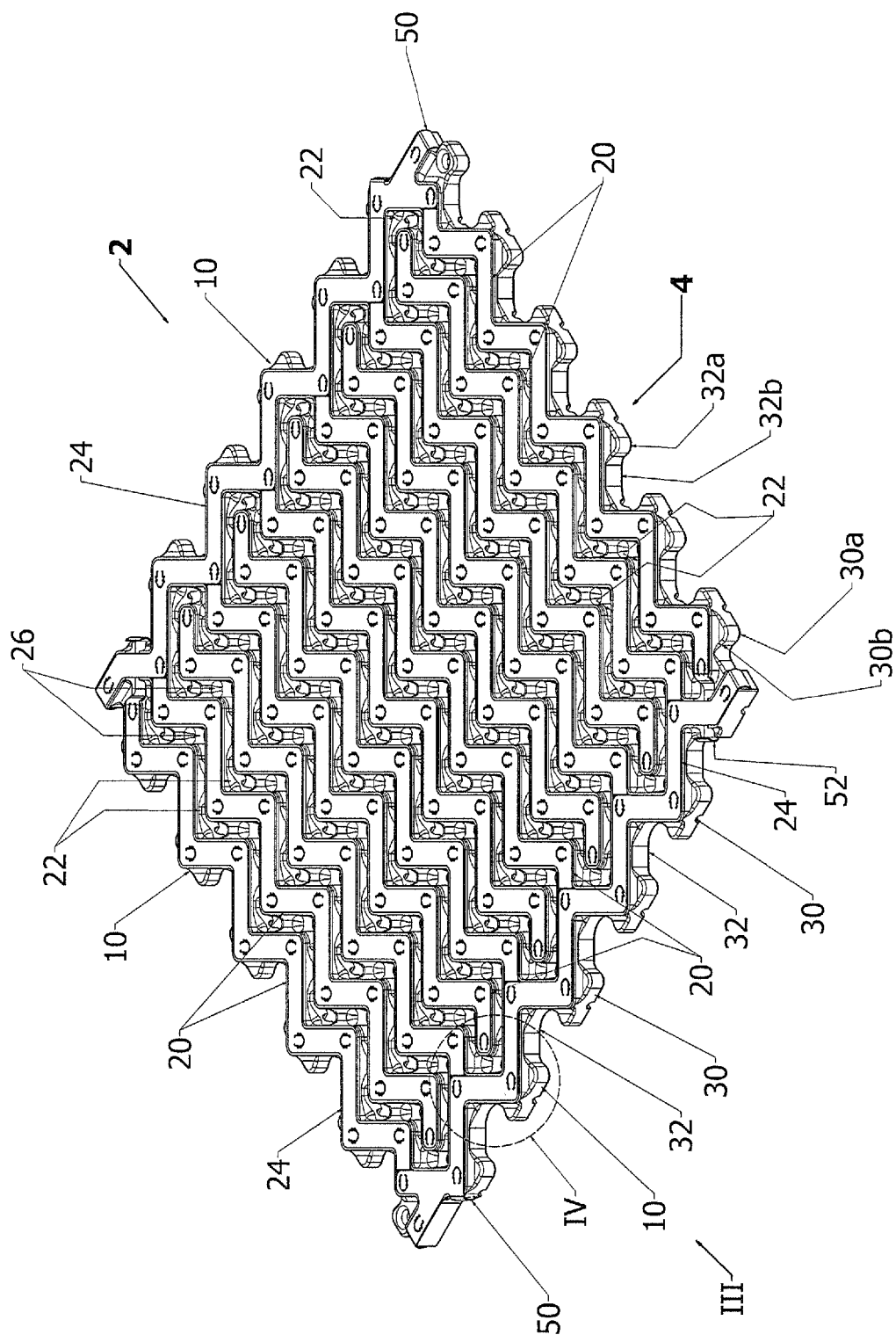
FIG. 1 is a perspective view of a barrier component according to one embodiment of the present invention.
Figure 3:
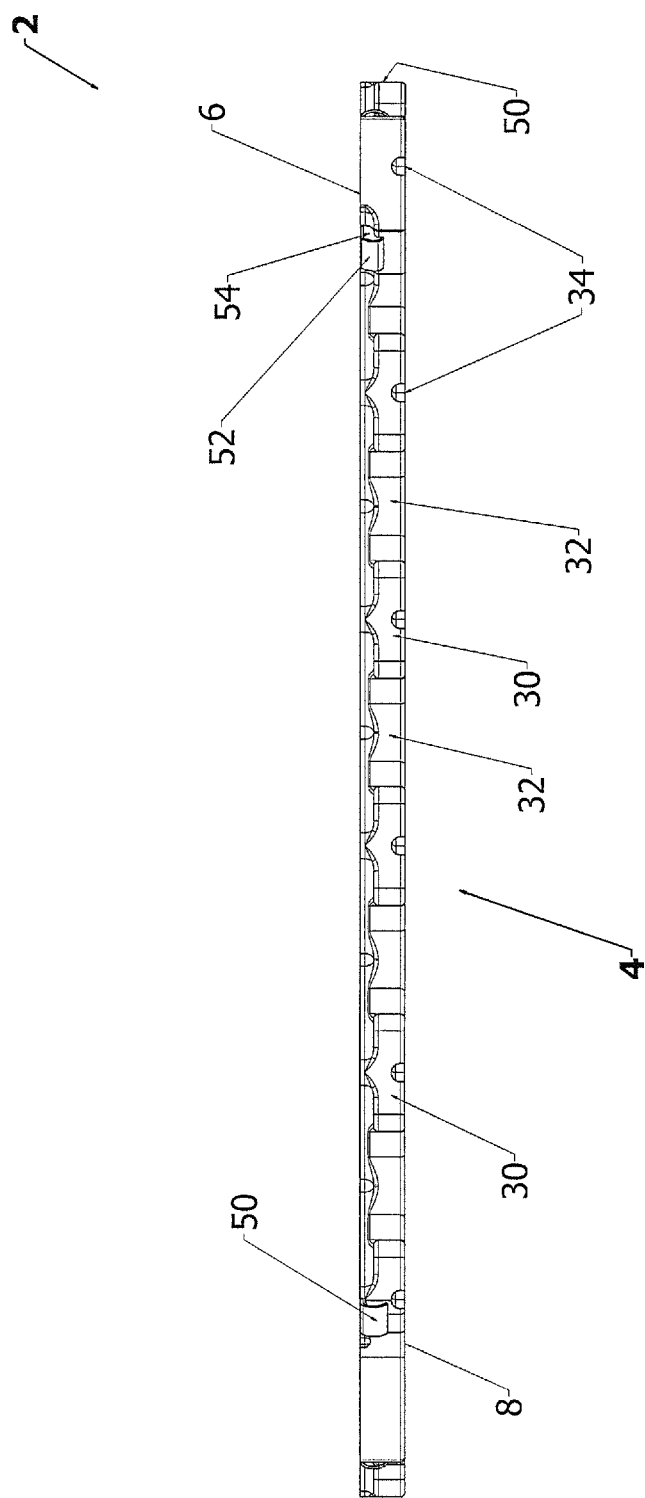
FIG. 3 is a view of one edge of the barrier component of FIG. 1 along the line III of FIG. 1.
Figure 4:
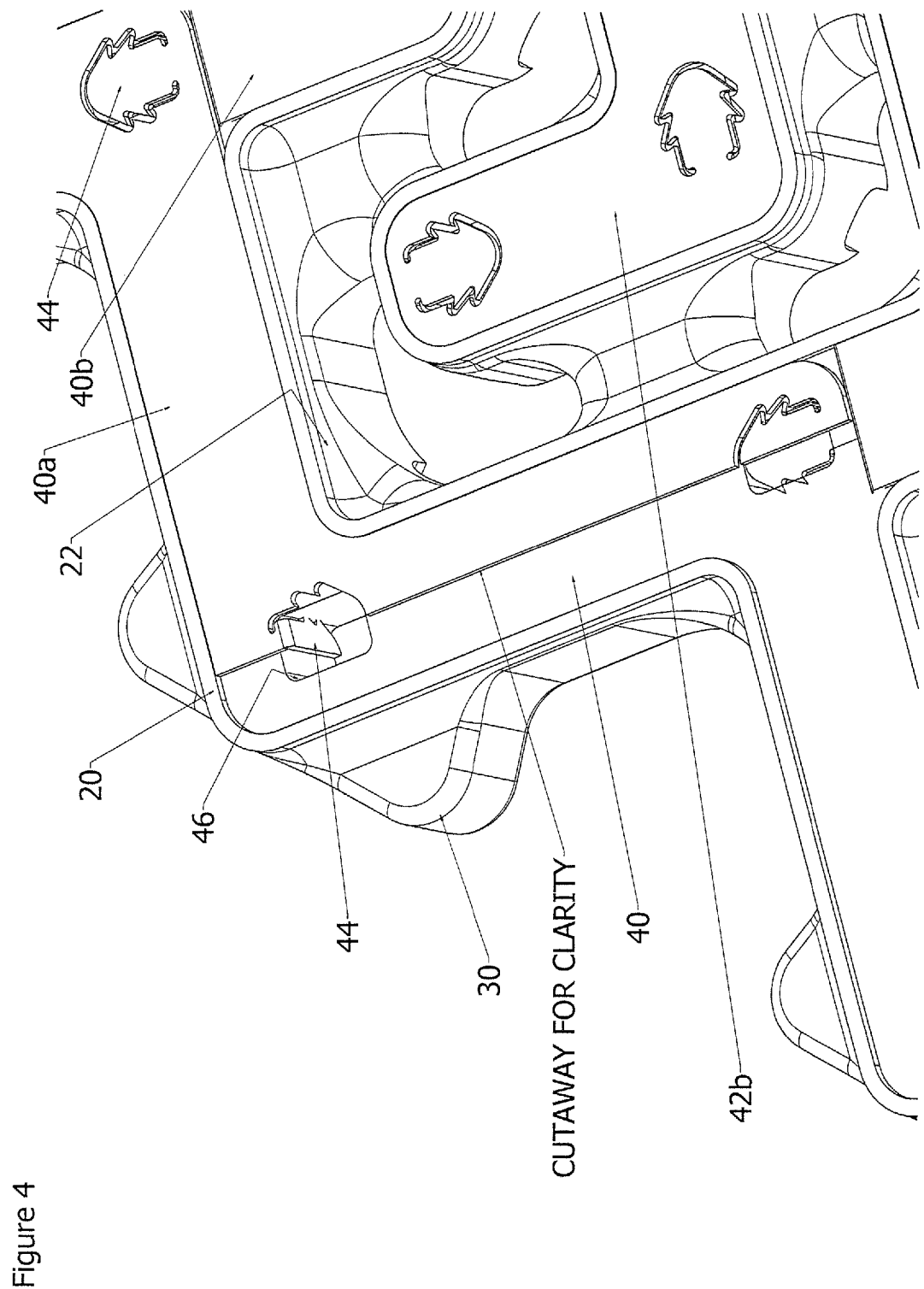
FIG. 4 is an enlarged view of a portion of the barrier component of FIG. 1 indicated by the circle IV.

Turning to FIG. 1, there is shown a perspective view of a barrier component according to one embodiment of the present invention. The barrier component, generally indicated as 2, is shown in plan view in FIG. 2 and in side view in FIG. 3. An enlarged view of a portion of the edge of the barrier component 2 is shown in FIG. 4.

The barrier component 2 comprises a generally square support member 4. The support member 4 is generally planar and has a first major surface 6 and a second major surface 8, with edges 10 extending between the two major surfaces 6, 8. The support member 4 is formed from PVC having a Shore A Hardness of about 90 and is prepared by moulding using conventional moulding techniques known in the art.

The first major surface 6 is provided with a plurality of spaced apart lands 20, adjacent lands separated by a channel 22. The lands 20 extend in a zig-zag pattern, as can be seen in FIG. 1. Each land 20 is provided with a shallow channel 24 in its upper surface, as viewed in FIG. 1. The shallow channel 24 accommodates a conductor member, described in more detail below.

Each channel 22 between adjacent lands 20 is provided with a plurality of holes 26 extending through the support member 4 to the second major surface 8. The holes 26 provide drainage and prevent water accumulating in the channels 22 and on the first major surface 8 of the support member.

The edges 10 of the support member 4 are provided with male connecting members 30 and female connecting members 32. The male connecting members 30 form protrusions extending from the edges 10 and comprise a wide distal portion 30a and a narrow proximal portion 30b. The female connecting members 32 form recesses between adjacent male connecting members 30 having the distal portion 32a of the recess narrower that the proximal portion 32b of the recess. The male connecting members 30 of one barrier component 2 engage with the female connecting members 32 of an adjacent barrier component when installed. However, the form of the male and female connecting members 30, 32 is such that they may only be engaged by moving one barrier component relative to the other barrier component in a direction perpendicular to the plane of the first major surface, that is up or down as viewed in FIGS. 1 and 3.

The second major surface 8 is provided with a plurality of channels 34 extending to the edges 10 of the support member 4. The channels 34 allow water to drain from beneath the support member 4 and prevent water from accumulating beneath the barrier component 2 when in use.

Figure 2:
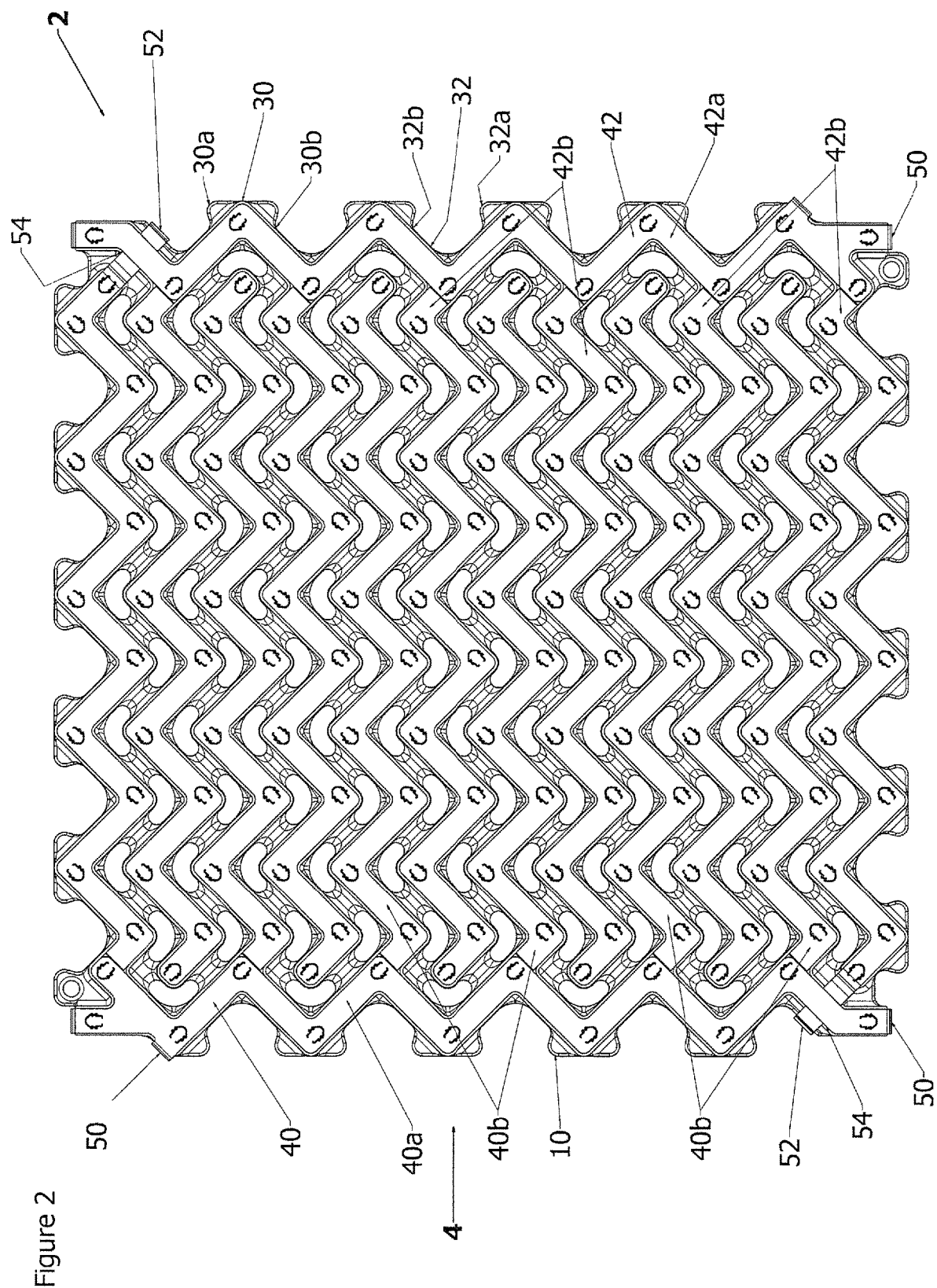
FIG. 2 is a plan view of the barrier component of FIG. 1 showing the first major surface thereof.

First conductor members 40 and second conductor members 42 are provided in the channels 22 in the lands 20. Each conductor member is formed from a strip of steel. Both the first and second conductor members 40, 42 comprise a plurality of conductor portions extending in an interdigitated zig-zag pattern, as can be seen in FIGS. 1 and 2 in particular. In particular, the first conductor member 40 comprises a first conductor portion 40a extending in a zig-zag pattern adjacent one edge 10 of the support member 4. A plurality of second conductor portions 40b extending in a zig-zag pattern generally perpendicular to the first conductor portion 40a across the support member 4 to the opposing edge 10. The second conductor member 42 is configured in an analogous manner and comprises a first conductor portion 42a extending in a zig-zag pattern adjacent the opposing edge 10 of the support member and a plurality of second conductor portions 42b extending in a zig-zag pattern generally perpendicular to the first conductor portion 42a across the support member to the opposing edge 10. The second conductor portions 42b of the second conductor member 42 extend generally towards the first conductor portion 40a of the first conductor member 40. Each of the second conductor portions 42b of the second conductor member 42 is adjacent one or two second conductor portions 40b of the first conductor member 40. This pattern of conductor members and portions provides a very complex path for an animal to navigate, without contacting some part of the first and second conductor members 40, 42 and generating an electric shock.

The manner in which the conductor members 40, 42 are attached to the lands 20 of the support member 4 is shown in detail in FIG. 4. The conductor members 40, 42 are provided with tabs 44 having a plurality of teeth along the edges of the tab. Each tab 44 is formed by being stamped from the metal strip of the conductor member. The lands 20 of the support member 4 are provided with a plurality of cavities 46 extending from the channel 24. When the conductor members 40, 42 are in place on the lands 20, each tab 44 is bent inwards into its respective cavity 46. The action of bending the tab 44 into the cavity 46 forces the teeth on the tab to engage with the inner surface of the cavity 46 and hold the conductor member in place.

To connect each of the first and second conductor members 40, 42 to an adjacent barrier component 2, in order to receive an electrical supply of the correct polarity, each conductor member 40, 42 is provided with an electrical contact member extending to the edges 10 of the support member 4. The electrical contact members are of two types. A first type of electrical contact member 50 is formed at an end of the first conductor portions 40a, 42a of first and second conductor members 40, 42. The contact member 50 is formed by the end portion of the conductor member being bent at the edge 10 away from the first major surface 6 towards the second major surface 8. The contact member 50 is resilient, by virtue of the inherent resilience of the metal strip forming the conductor member, and is biased away from the edge 10.

A second type of contact member 52 is formed at an end of a second conductor portion 40b, 42b of first and second conductor members 40, 42. The contact member 52 is formed by the end portion of the conductor member extending to the edge 10 and being bent at the edge 10 away from the second major surface 8 towards the first major surface 6. The contact member 50 is resilient, by virtue of the inherent resilience of the metal strip forming the conductor member, and is biased away from the edge 10. In order to reach the edge 10, the contact member 52 of one of the first and second conductor members 40, 42 must cross the first conductor portion 40a, 42a of the other of the first and second conductor members. To avoid a short circuit, the contact member 52 must be insulated from the first conductor portion 40a, 42a. To achieve this, the support member 4 is provided with a groove 54 extending to the respective edge 10. The contact member 52 extends along the groove 54 from the respective second conductor portion 40b, 42b to the edge 10. In this way, the contact member 52 extends between the second conductor portion 40b, 42b and the support member 4 and is sufficiently spaced apart from the second conductor portion 40b, 42b to provide electrical insulation.

By having the contact members 50, 52 bent as described above, each presents a contact surface at the edge 10 of the support member 4 which is engaged by the corresponding contact surface of the contact members of an adjacent barrier component when installed. The arrangement of the contact members 50, 52 ensures that electrical contact is made when adjacent barrier components are installed in the manner described above, by moving one barrier component relative to the other in a direction perpendicular to the plane of the first major surface 6.

In the embodiment of the barrier component shown in FIGS. 1 to 4, each of the first and second conductor members 40, 42 has an electrical contact member 50, 52 at each edge 10 of the support member. As will be appreciated, when the first and second conductor members are employed with an opposite electrical polarity, it is necessary to connect adjacent barrier components in an installation in the correct orientation, to ensure electrical continuity of the first and second contact members and avoid a short circuit. To ensure this is done, the arrangement of the male and female connecting members 30, 32 along the edges 10 of the support member allows adjacent barrier components only to be connected together along edges that provide an electrical connection of the correct polarity. In particular, the number, size and distribution of the male and female contact members 30, 32 along each edge ensures that only connections between adjacent barrier components of the correct polarity can be made.

Figure 5:
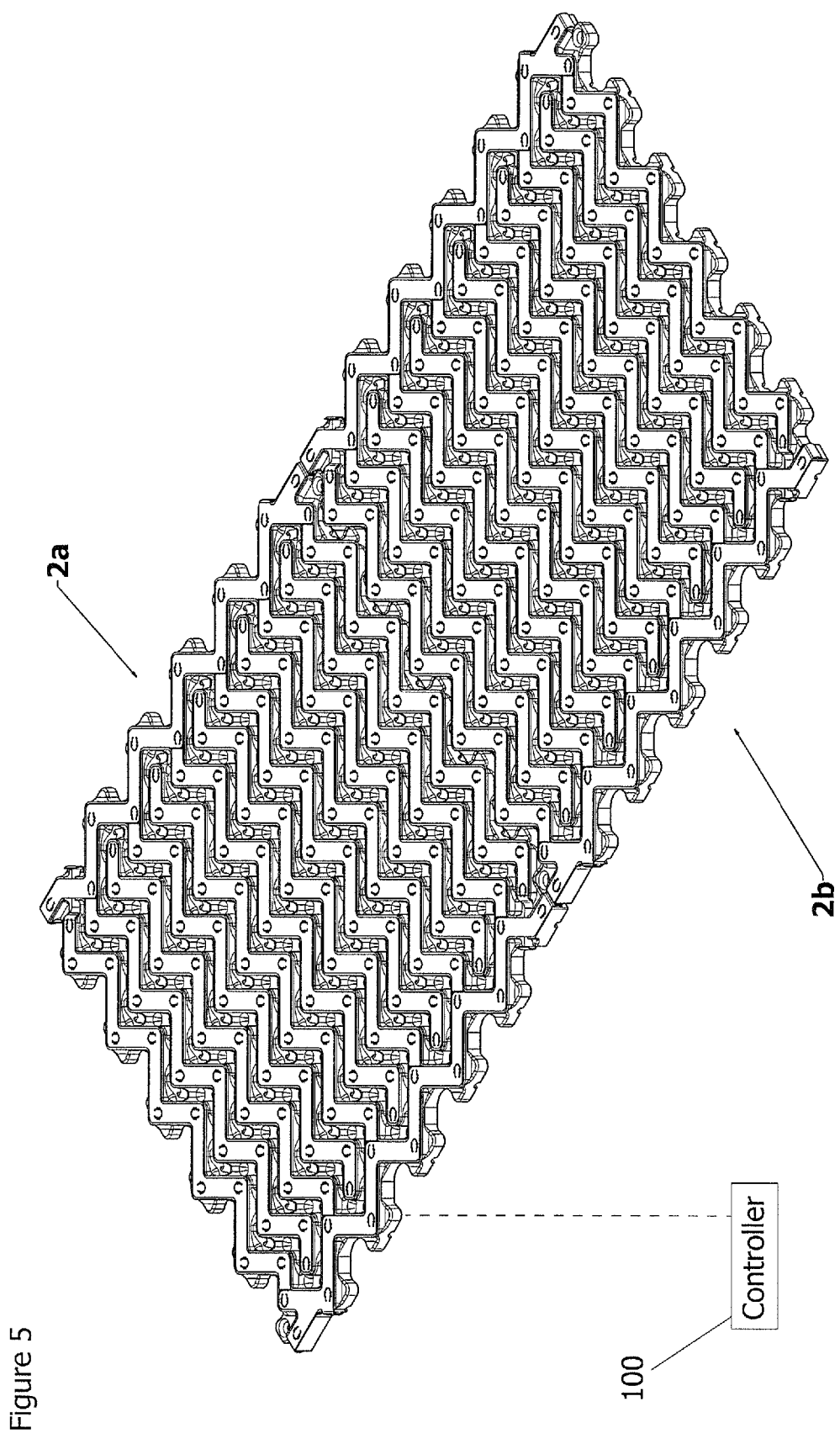
FIG. 5 is a perspective view of a barrier system for deterring animals comprising two barrier components of the embodiment shown in FIG. 1 and connected to form a first mat.
Figure 6:
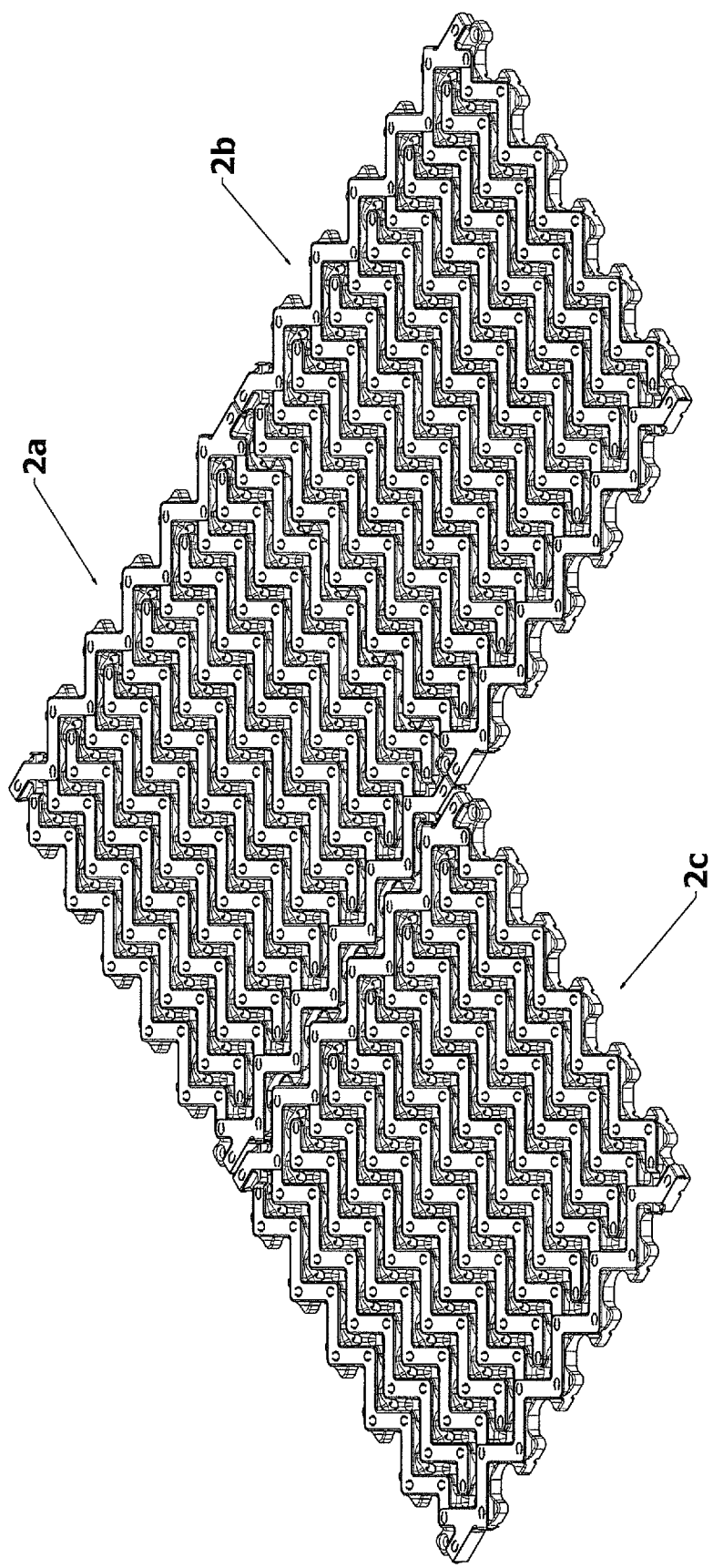
FIG. 6 is a perspective view of a barrier system comprising three barrier components of the embodiment shown in FIG. 1 and connected to form a second mat.

Turning to FIG. 5, there is shown a perspective view of a barrier system comprising two barrier components of the type shown in FIGS. 1 to 4 and described in detail above. The two barrier components 2a, 2b are connected along one edge 10 and form an n×m matrix in which n is 2 and m is 1. It will be appreciated that further barrier components 2 may be added to the matrix, as required to cover the area around the items or installations to be protected. For example, FIG. 6 shows a barrier system comprising three barrier components 2a, 2b, 2c of the type shown in FIGS. 1 to 4 and described above.

Figure 7:
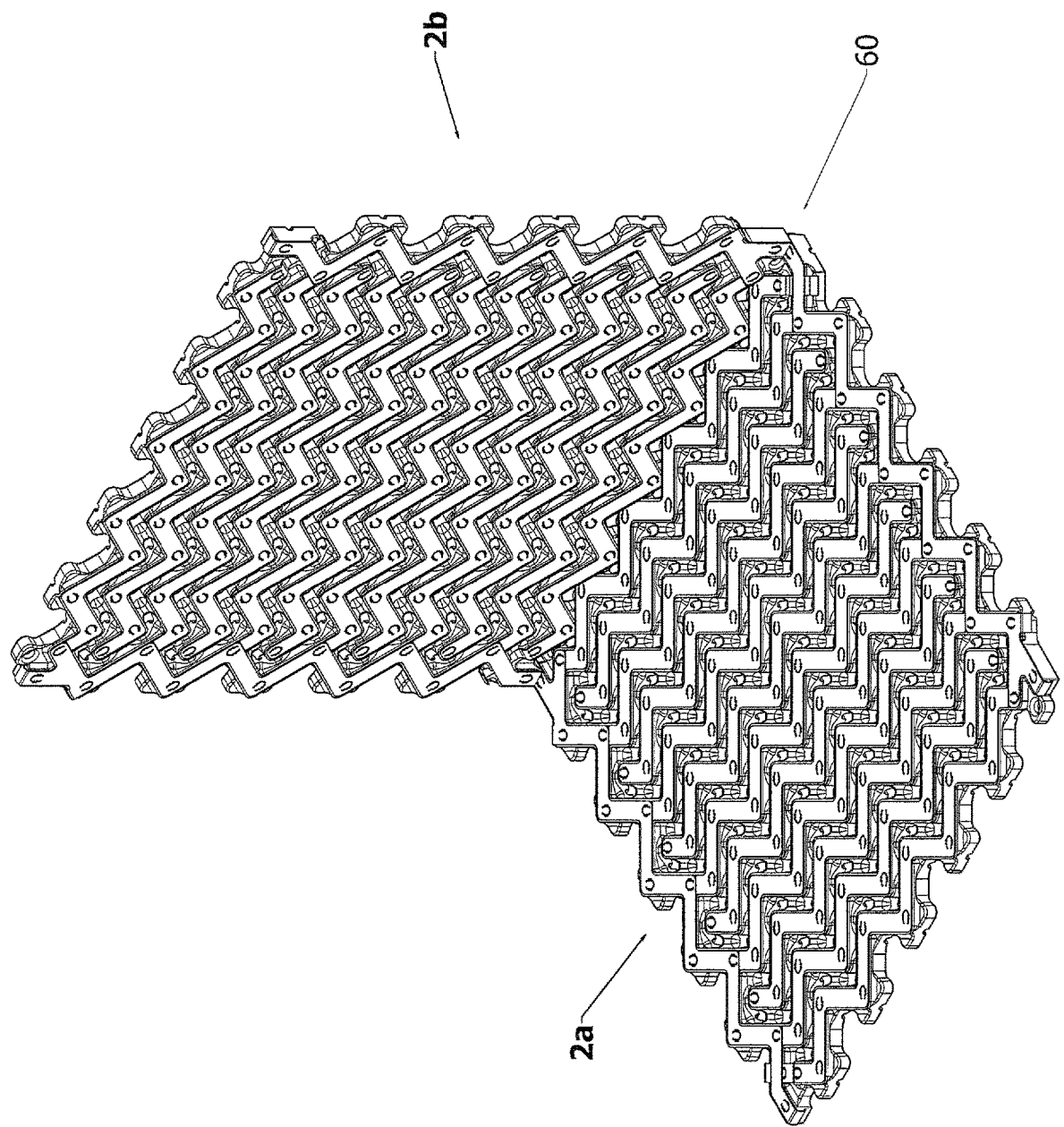
FIG. 7 is a perspective view of a barrier system comprising two barrier components of the embodiment shown in FIG. 1 and connected to form a combined mat and wall.

An alternative installation is shown in FIG. 7. The installation comprises a first barrier component 2a installed in a horizontal orientation and a second barrier component 2b installed perpendicular thereto. Again, the barrier components 2a, 2b are of the type shown in FIGS. 1 to 4 and described above. The barrier components 2a, 2b are connected and held together by a connecting component 60, shown in perspective view in FIG. 8. The connecting component 60 comprises two connecting portions 62a, 62b arranged perpendicular to one another. Each connecting portion 62a, 62b comprises a plurality of male and female connecting members 30, 32 corresponding to and connectable with the connecting members of the edges of the barrier components 2a, 2b. It is to be understood that the connecting portions 62a, 62b may extend at angles other than 90° with respect to each other, to allow barrier components to be oriented at different angles to each other in the installation.

Figure 8:
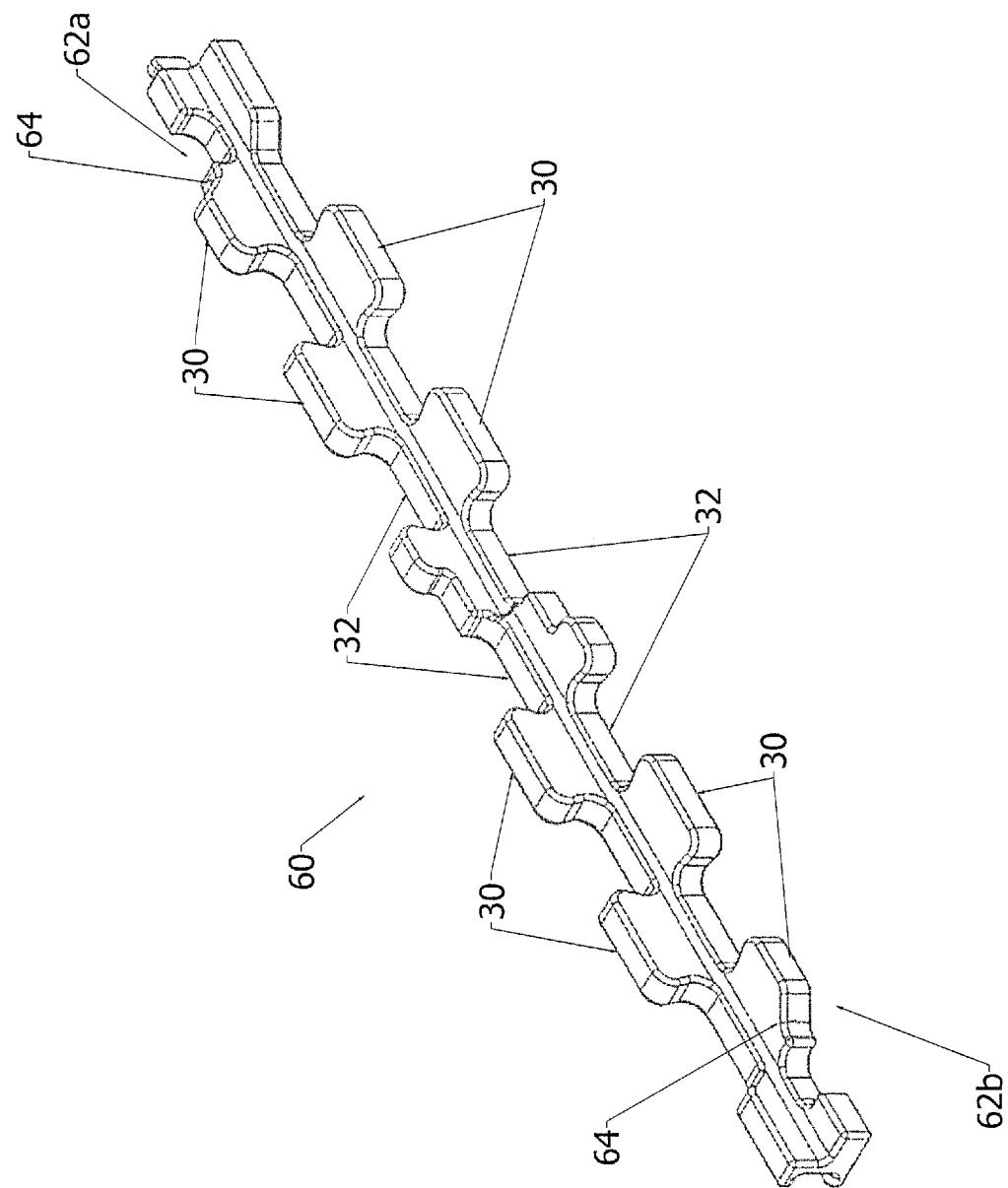
FIG. 8 is a perspective view of a connecting component of one embodiment of the present invention.

As shown in FIG. 8, a number of the male connecting members of the connecting component are provided with a notch 64 in its edge. This allows a single connecting member to be connected to the barrier components along two different edge formations. In this way, a single connecting component can be employed with barrier components having two different edge formations, as described above.

The connecting component 60 may be provided with electrical connections to connect the first and second conductor members 40, 42 of the barrier components 2a, 2b, for example with strips of metal formed in analogous manner to the conductor members described above. Alternatively, the electrical connection between the barrier components 2a, 2b may be provided by leads running external to the connecting component. As a further alternative, a separate electrical supply may be provided in parallel to the barrier components 2a, 2b either side of the connecting component.

Figure 9:
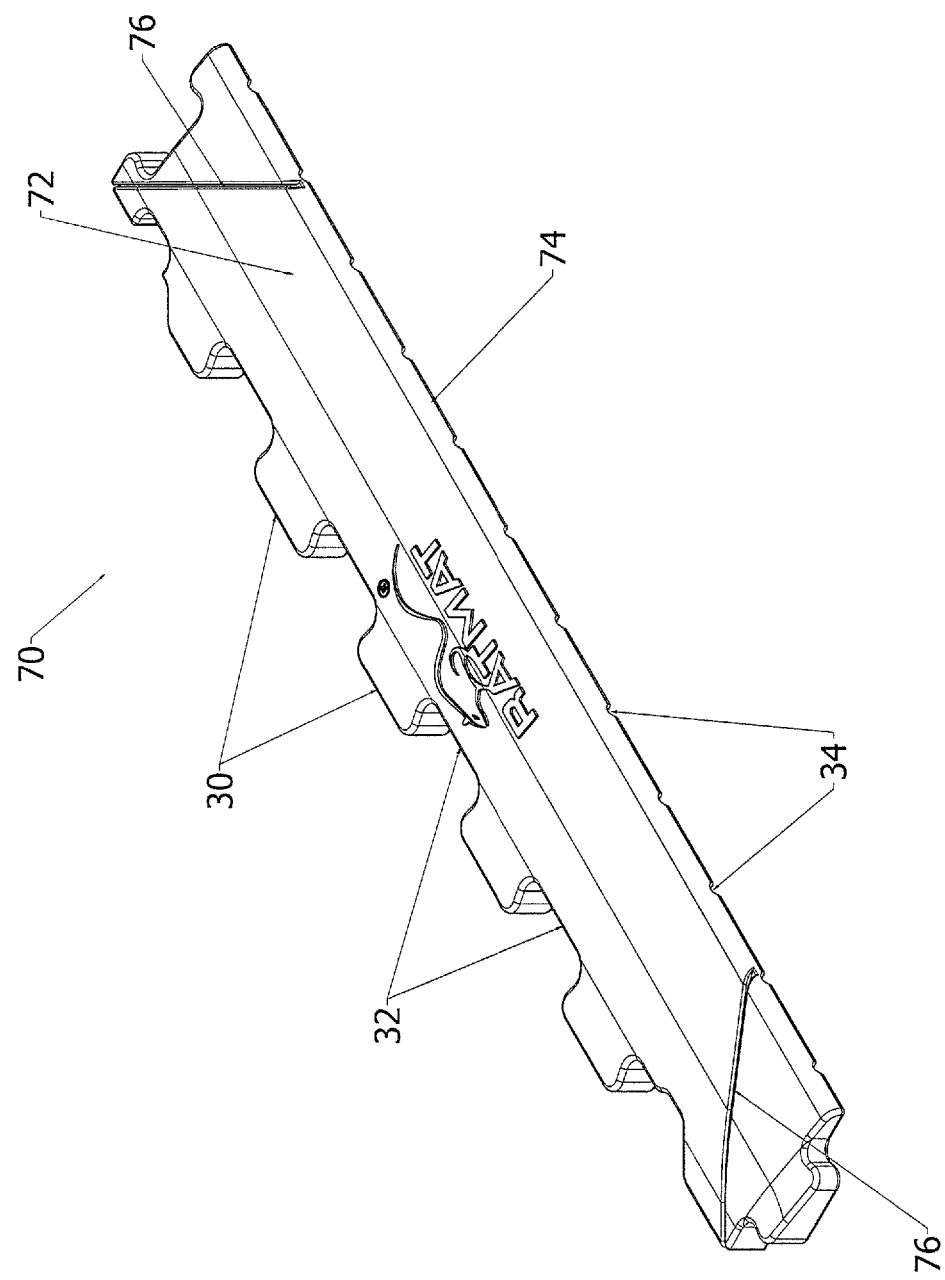
FIG. 9 is a perspective view of an edge component of one embodiment of the present invention.

Referring to FIG. 9, there is shown an edge component for use in an installation of the barrier components. The edge component 70 may be used to cover and protect the exposed edges 10 of the barrier components 2 in the installation. The edge component 70 comprises a plurality of male and female connecting members 30, 32 corresponding to and connectable with the connecting members of the edges of the barrier components. The edge component comprises a chamfered surface 72 extending from the connecting members, terminating at the opposite edge in a rounded bevel 74. Drainage channels 34 are formed in the edge component 70, to align with the corresponding channels 34 in the second major surface 8 of the support member 4. Each end portion of the edge component 70 is provided with a line of weakness 76 extending at 45° to the edges of the component. In use, the end portions of the edge component 70 may be cut or snapped off along this line 76, allowing the edge component to be used adjacent and internal corner between two barrier components.

The edge component 70 may be provided with electrical connections to connect the first and second conductor members of the installed barrier components with an electrical supply.

In use as an animal deterrent, the matrix of one or more barrier components 2 is provided with electrical energy by a controller 100, represented in FIG. 5, which in turn is connected to an electrical supply, for example a domestic or industrial mains supply. The controller 100 operates to establish a potential difference between the first and second conductor members 40, 42 of the interconnected barrier components, using electrical charge stored in a capacitor. When an animal contacts both the first and second conductor members 40, 42, an electrical circuit is completed, which in turn discharges the capacitor to provide pulses of electrical energy, applying a pulsed electric shock to the animal.

In use to dissipate an accumulation of static electrical charge, the matrix of one or more barrier components 2 is connected to a suitable earth, for example the earth of a convenient mains electrical supply or an independent connection to earth. When a person or other item having an accumulation of static electrical charge walks on or contacts the barrier components, the accumulated static charge is dissipated through the conductor members of the barrier components to earth. In this way, a discharge of the static charge, in particular a discharge causing a spark, is avoided.

Aspects and embodiments of the present invention are summarised by the following numbered clauses:

1. A barrier system, the barrier system comprising a first barrier component comprising:
   a support member formed from an electrically insulating material and having a first major surface, a second major surface and one or more edges extending between the first and second major surfaces;
   a first electrical conductor assembly comprising a first conductor member disposed on the first major surface of the support member;
   a second electrical conductor assembly comprising a second conductor member disposed on the first major surface of the support member, the second conductor member spaced apart and electrically insulated from the first conductor member;
   each of the first and second electrical conductor assemblies comprising an electrical contact member disposed an edge of the support member;
   wherein each electrical contact member and the respective edge of the support member are configured to connect with a corresponding electrical contact member and the respective edge of a corresponding second barrier component, with the connection being formed by the movement of the second barrier component relative to the first barrier component in a direction substantially perpendicular to the plane of the first major surface.
2. The barrier system according to clause 1, wherein the support member is shaped to be able to engage with the support member of an adjacent barrier component.
3. The barrier system according to either of clauses 1 or 2, wherein the support member is polygonal in shape.
4. The barrier system according to clause 3, wherein the support member is rectangular.
5. The barrier system according to any preceding clause, wherein the support member has a thickness of from 1 to 4 cm.
6. The barrier system according to any preceding clause, wherein the support member is formed form polyvinylchloride (PVC).
7. The barrier system according to any preceding clause, wherein the first major surface of the support member comprises a plurality of spaced apart lands, with adjacent lands separated by a cavity, the conductor members being mounted on the lands.
8. The barrier system according to clause 7, wherein each land accommodates a single conductor member.
9. The barrier system according to any preceding clause, wherein the support member comprises holes extending from the first major surface to the second major surface.
10. The barrier system according to any preceding clause, wherein the distance between the first and second conductor members is up to 30 mm.
11. The barrier system according to clause 10, wherein the distance between the first and second conductor members is from 5 to 25 mm.

12. The barrier system according to any preceding clause, wherein the conductor members are formed from strips of an electrically conductive material.
13. The barrier system according to clause 12, wherein the strips have a width of from 5 to 25 mm.
14. The barrier system according to any preceding clause, wherein the width of the first conductor member is substantially the same as the width of the second conductor member.
15. The barrier system according to any preceding clause, wherein the thickness of the first and second conductor members is from 0.5 to 3 mm.
16. The barrier system according to any preceding clause, wherein the first and second conductor members each extend in a non-linear pattern.
17. The barrier system according to clause 16, wherein the first and second conductor members each extend in a zig-zag pattern.
18. The barrier system according to either of clauses 16 or 17, wherein each of the first and second conductor members comprises a plurality of conductor portions.
19. The barrier system according to clause 18, wherein the conductor portions of the first conductor member are interdigitated with the conductor portions of the second conductor member.
20. The barrier system according to any preceding clause wherein each of the first and second conductor assemblies comprises a plurality of contact members at one or more than one edge of the support member.
21. The barrier system according to clause 20, wherein each of the first and second conductor assemblies comprises a plurality of contact members at each edge of the support member.
22. The barrier system according to any preceding clause, wherein each contact member has a contact surface that is biased laterally away from the respective edge of the support member.
23. The barrier system according to clause 22, wherein each contact member is resilient.
24. The barrier system according to either of clauses 22 or 23, wherein each contact member comprises a contact surface extending substantially perpendicular to and away from the first major surface of the support member.
25. The barrier system according to any preceding clause, wherein one or more edge portions of the support member are provided with one or more engaging elements for engaging with an adjacent barrier component.
26. The barrier system according to clause 25, wherein the one or more engaging elements engage with a second barrier component by movement along a line substantially perpendicular to the plane of the first major surface.
27. The barrier system according to either of clauses 25 or 26, wherein one or more edges of the support member are provided with a plurality of male engaging elements, adjacent male engaging elements being separated by a female engaging
28. The barrier system according to any of clauses 25 to 27, wherein the arrangement of the engaging elements on a first edge portion of the support member is different to and incompatible with the arrangement of the engaging elements of a second edge portion of the support member.
29. A barrier system comprising a first barrier component and a second barrier component, each of the first barrier component and second barrier component comprising:
a support member formed from an electrically insulating material and having a first major surface, a second major surface, a first edge portion having a first edge extending between the first and second major surfaces and a second edge portion having a second edge extending between the first and second major surfaces;
a first electrical conductor assembly comprising a first conductor member disposed on the first major surface of the support member and having an electrical contact member at each of the first and second edges;
a second electrical conductor assembly comprising a second conductor member disposed on the first major surface of the support member, the second electrical conductor member spaced apart and electrically insulated from the first electrical conductor member and having an electrical contact member at each of the first and second edges;
wherein the first edge portion is provided with one or more first engaging elements and the second edge portion is provided with one or more second engaging elements, the arrangement of the second engaging elements on the second edge portion being of a different configuration to the arrangement of the first engaging elements on the first edge portion;
whereby the first edge portion of the first barrier component is configured to engage with the first edge portion of the second barrier component, the second edge portion of the first barrier component is configured to engage with the second edge portion of the second barrier component, and the first edge portion of the first barrier component is not engageable with the second edge portion of the second barrier component.
30. A barrier system comprising a barrier component comprising:
a support member formed from an electrically insulating material and having a first major surface, a second major surface and one or more edges extending between the first and second major surfaces;
a first electrical conductor assembly comprising a first conductor member disposed on the first major surface of the support member;
a second electrical conductor assembly having a second conductor member disposed on the first major surface of the support member, the second electrical conductor member spaced apart and electrically insulated from the first electrical conductor member;
the first conductor assembly comprising a first electrical contact member at an edge of the support member and the second conductor assembly comprising a second electrical contact member at the edge of the support member;
a portion of the first conductor member extending between the second conductor member and the support member to the edge of the support member, the portion of the first conductor member being spaced apart and electrically insulated from the second conductor member.
31. The barrier system according to clause 30, wherein the support member is provided with an opening to accommodate the portion of the first conductor member.
32. The barrier system according to clause 31, wherein the opening is a recess in the first major surface of the support member.

33. The barrier system according to any of claims 30 to 32, wherein air provides the electrical insulation between the portion of the first conductor member and the second conductor member.
34. A barrier component comprising:
   a support member formed from an electrically insulating material and having a first major surface, a second major surface and one or more edges extending between the first and second major surfaces;
   a first electrical conductor assembly comprising a first electrical conductor member disposed on the first major surface of the support member; and
   a second electrical conductor assembly comprising a second electrical conductor member disposed on the first major surface of the support member, the second electrical conductor member spaced apart and electrically insulated from the first electrical conductor member;
   wherein each of the first and second electrical conductor members comprises at least one engaging member, each engaging member extending from the first major surface into a cavity formed in the support member, each engaging member engaging the inner surface of the respective cavity to retain the electrical conductor on the first major surface of the support member.
35. The barrier system according to clauses 34, wherein each conductor member is provided with a plurality of engaging members.
36. The barrier system according to either of clauses 34 or 35, wherein each engaging member comprises a tab extending from the respective conductor member.
37. The barrier system according to clause 36, wherein each tab is provided with one or more teeth.
38. The barrier system according to any of clauses 34 to 37, wherein the cavity is a bore extending through the support member from the first major surface to the second major surface.
39. A barrier system comprising a first barrier component and a second barrier component, each of the first and second barrier components comprising:
   a support member formed from an electrically insulating material and having a first major surface, a second major surface and an edge portion having an edge extending between the first and second major surfaces, the edge portion comprising a plurality of engaging members;
   a first electrical conductor assembly comprising a first conductor member disposed on the first major surface of the support member;
   a second electrical conductor assembly comprising a second conductor member disposed on the first major surface of the support member, the second electrical conductor member spaced apart and electrically insulated from the first electrical conductor member;
   the barrier system further comprising a connecting component comprising a first edge portion having a plurality of engaging members for engaging with the edge portion of the first barrier component and a second edge portion having a plurality of engaging members for engaging with the edge portion of the second barrier component.
40. The barrier system according to clause 39, wherein the connecting component holds the first and second barrier components perpendicular to one another.
41. A barrier system comprising a barrier component, the barrier component comprising:
   a support member formed from an electrically insulating material and having a first major surface, a second major surface and one or more edges extending between the first and second major surfaces, wherein the support member is formed from a thermoplastic polymer having a Shore A Hardness of from 80 to 100;
   a first electrical conductor assembly comprising a first conductor member disposed on the first major surface of the support member; and
   a second electrical conductor assembly comprising a second conductor member disposed on the first major surface of the support member, the second electrical conductor member spaced apart and electrically insulated from the first electrical conductor member.
42. The barrier system according to clause 41, wherein the thermoplastic polymer has a Shore A Hardness of from 85 to 95.
43. The barrier system according to clause 42, wherein the Shore A Hardness is about 90.
44. The barrier system according to any preceding clause, further comprising a controller.
45. The barrier system according to clause 44, wherein the controller is configured to supply electrical energy in pulses at a frequency up to 2 Hz.
46. The barrier system according to either of clauses 44 or 45, wherein the controller is configured to supply electrical energy in pulses of a duration of from 0.5 to 6 ms.
47. The barrier system according to any of clauses 44 to 46, wherein the controller is configured to supply electrical energy at a potential of from 7,000 to 8,000 V.
48. An animal deterrent barrier system comprising one or more barrier components as defined in any of clauses 1 to 43.
49. A static electricity dissipating barrier system comprising one or more barrier components as defined in any of clauses 1 to 43.
50. Use of one or more barrier components as defined in any of clauses 1 to 43 in the deterring of animals.
51. Use of one or more barrier components as defined in any of clauses 1 to 43 in the dissipation of an accumulation of static electrical charge

The invention claimed is:
1. A barrier system, the barrier system comprising a first barrier component comprising:
   a support member formed from an electrically insulating material and having a first major surface extending in a first plane, a second major surface extending in a second plane and one or more edges extending between the first and second major surfaces;
   a first electrical conductor assembly comprising a first conductor member disposed on the first major surface of the support member;
   a second electrical conductor assembly comprising a second conductor member disposed on the first major surface of the support member, the second conductor member spaced apart and electrically insulated from the first conductor member;
   wherein each of the first and second conductor members comprises a plurality of conductor portions; and wherein the conductor portions of the first conductor member are interdigitated with the conductor portions of the second conductor member;
   each of the first and second electrical conductor assemblies comprising an electrical contact member disposed on the one or more edges of the support member and extending from the first major surface of the support member towards the second major surface of the support member, each electrical contact member presenting a contact surface at the one or more edges of the support member for engagement by a contact surface of a corresponding electrical contact member of an adjacent corresponding second barrier component;

wherein each electrical contact member and the respective one or more edges of the support member are configured to connect with the corresponding electrical contact member and a respective edge of the adjacent corresponding second barrier component, with the connection being formed by the movement of the adjacent corresponding second barrier component relative to the first barrier component in a direction substantially perpendicular to the plane of the first major surface, the direction being from the first major surface towards the second major surface.

2. The barrier system according to claim 1, wherein the support member is shaped to be able to engage with the support member of an adjacent barrier component.

3. The barrier system according to claim 1, wherein the first major surface of the support member comprises a plurality of spaced apart lands, with adjacent lands separated by a cavity, the conductor members being mounted on the lands.

4. The barrier system according to claim 3, wherein each land accommodates a single conductor member.

5. The barrier system according to claim 1, wherein the first and second conductor members each extend in a non-linear pattern.

6. The barrier system according to claim 1, wherein each of the first and second conductor assemblies comprises a plurality of contact members at each one or more edges of the support member.

7. The barrier system according to claim 1, wherein each contact member has a contact surface that is biased laterally away from the respective one or more edges of the support member.

8. The barrier system according to claim 7, wherein each contact member comprises a contact surface extending substantially perpendicular to and away from the first major surface of the support member.

9. The barrier system according to claim 1, wherein one or more edge portions of the support member are provided with one or more engaging elements for engaging with an adjacent barrier component.

10. The barrier system according to claim 9, wherein the one or more engaging elements engage with the adjacent corresponding second barrier component by movement along a line substantially perpendicular to the plane of the first major surface.

11. The barrier system according to claim 10, wherein the arrangement of the engaging elements on a first edge portion of the support member is different to and incompatible with the arrangement of the engaging elements of a second edge portion of the support member.

12. The barrier system according to claim 1, wherein a portion of the first conductor member extends between the second conductor member and the support member to the one or more edges of the support member, the portion of the first conductor member being spaced apart and electrically insulated from the second conductor member.

13. The barrier system according to claim 1, wherein each of the first and second electrical conductor members comprises at least one engaging member, each engaging member extending from the first major surface into a cavity formed in the support member, each engaging member engaging the inner surface of the respective cavity to retain the electrical conductor on the first major surface of the support member.

14. The barrier system according to claim 13, wherein each engaging member comprises a tab extending from the respective conductor member.

15. The barrier system according to claim 1, further comprising a controller.

16. The barrier system according to claim 1, wherein the barrier system is an animal deterrent barrier system comprising one or more barrier components.

17. The barrier system according to claim 1, wherein the barrier system is a static electricity dissipating barrier system comprising one or more barrier components.

18. Use of one or more barrier components as defined in claim 1 in the deterring of animals.

19. Use of one or more barrier components as defined in claim 1 in the dissipation of an accumulation of static electrical charge.

* * * * *